(12) United States Patent
Ocray, Jr. et al.

(10) Patent No.: US 11,762,685 B2
(45) Date of Patent: Sep. 19, 2023

(54) METHOD AND APPARATUS FOR SCALING RESOURCES OF GRAPHICS PROCESSING UNIT IN CLOUD COMPUTING SYSTEM

(71) Applicant: Samsung Electronics Co., Ltd., Suwon-si (KR)

(72) Inventors: Danilo P. Ocray, Jr., Taguig (PH); Mark Andrew D. Bautista, Taguig (PH); Alvin Lee C. Ong, Taguig (PH); Joseph Alan P. Baking, Taguig (PH); Jaesung An, Suwon-si (KR); Manuel F Abarquez, Jr., Taguig (PH); Sungrok Yoon, Suwon-si (KR); Youngjin Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 471 days.

(21) Appl. No.: 16/930,799

(22) Filed: Jul. 16, 2020

(65) Prior Publication Data

US 2021/0191762 A1    Jun. 24, 2021

(30) Foreign Application Priority Data

Dec. 22, 2019    (PH) .................. 1-2019-050292

(51) Int. Cl.
| | | |
|---|---|---|
| *G06F 9/48* | (2006.01) | |
| *G06F 9/50* | (2006.01) | |
| *G06T 1/20* | (2006.01) | |
| *G06F 9/54* | (2006.01) | |

(52) U.S. Cl.
CPC .......... *G06F 9/4881* (2013.01); *G06F 9/5038* (2013.01); *G06F 9/5077* (2013.01); *G06F 9/546* (2013.01); *G06T 1/20* (2013.01)

(58) Field of Classification Search
None
See application file for complete search history.

(56) References Cited

U.S. PATENT DOCUMENTS

| | | | | |
|---|---|---|---|---|
| 6,662,203 B1 * | 12/2003 | Kling | .................... | G06F 9/4881 718/103 |
| 7,155,716 B2 * | 12/2006 | Hooman | ............... | G06F 9/4881 711/100 |

(Continued)

FOREIGN PATENT DOCUMENTS

| | | |
|---|---|---|
| KR | 10-1620602 B1 | 5/2016 |
| KR | 10-2018-0071056 A | 6/2018 |

(Continued)

OTHER PUBLICATIONS

Gu et al.; "GaiaGPU: Sharing GPUs in Container Clouds"; IEEE 2018; (Gu_2018.pdf; pp. 469-476) (Year: 2018).*

(Continued)

*Primary Examiner* — Hiren P Patel
(74) *Attorney, Agent, or Firm* — Jefferson IP Law, LLP (57) ABSTRACT

A method and apparatus for scaling resources of a GPU in a cloud computing system are provided. The method includes receiving requests for services from a client device, queuing the received requests in a message bus based on a preset prioritization scheme; and scaling the resources of the GPU for the requests queued in the message bus according to a preset prioritization loop.

18 Claims, 6 Drawing Sheets

(56) References Cited

U.S. PATENT DOCUMENTS

| | | | | |
|---|---|---|---|---|
| 8,413,152 | B2* | 4/2013 | Kobayashi | G06F 9/52 710/36 |
| 8,984,341 | B1 | 3/2015 | Chandrasekharapuram | H04L 43/50 714/32 |
| 9,462,427 | B2 | 10/2016 | Patel et al. | |
| 9,594,608 | B2* | 3/2017 | Simsek | G06F 9/546 |
| 9,916,636 | B2 | 3/2018 | Li et al. | |
| 10,503,553 | B1* | 12/2019 | Ashok | G06F 11/3024 |
| 10,558,596 | B2* | 2/2020 | Nielsen | G06N 20/00 |
| 10,783,472 | B2* | 9/2020 | Carpenter | G06N 20/00 |
| 11,113,120 | B1* | 9/2021 | Greenfield | G06F 9/4881 |
| 11,494,692 | B1* | 11/2022 | Watkins | H04L 67/1089 |
| 2005/0240934 | A1* | 10/2005 | Patterson | G06F 3/0689 718/105 |
| 2012/0221810 | A1* | 8/2012 | Shah | G06F 13/1642 711/158 |
| 2014/0176583 | A1* | 6/2014 | Abiezzi | G06F 9/5044 345/522 |
| 2016/0125566 | A1 | 5/2016 | Kim et al. | |
| 2017/0046202 | A1* | 2/2017 | Bao | G06F 9/4881 |
| 2017/0132746 | A1* | 5/2017 | Wilt | G06F 9/5077 |
| 2017/0132747 | A1* | 5/2017 | Wilt | G06F 9/445 |
| 2017/0149690 | A1* | 5/2017 | Le Rudulier | H04L 47/821 |
| 2018/0270165 | A1 | 9/2018 | Chen et al. | |
| 2018/0285294 | A1 | 10/2018 | Chagam Reddy | |
| 2019/0197655 | A1* | 6/2019 | Sun | G06F 9/5077 |
| 2019/0272615 | A1 | 9/2019 | Koker et al. | |
| 2020/0076922 | A1* | 3/2020 | Punadikar | H04L 67/01 |
| 2020/0210241 | A1 | 7/2020 | Kim et al. | |
| 2020/0394748 | A1* | 12/2020 | Wilt | G06F 9/5077 |
| 2021/0099517 | A1* | 4/2021 | Friedrich | G06N 20/00 |
| 2021/0377340 | A1* | 12/2021 | Friedrich | H04L 67/1029 |

FOREIGN PATENT DOCUMENTS

| | | |
|---|---|---|
| KR | 10-1990411 B1 | 10/2019 |
| KR | 10-2032521 B1 | 10/2019 |

OTHER PUBLICATIONS

Iserte et al.; "GSaaS: A Service to Cloudify and Schedule GPUs", IEEE 2018; (Iserte_2018.pdf; pp. 39762-39774) (Year: 2018).*

Al-Dhuraibi et al., Elasticity in Cloud Computing: State of the Art and Research Challenges, IEEE Transactions on Services Computing, vol. 11, No. 2, Apr. 1, 2018.

Fernandez et al, Autoscaling Web Applications in Heterogeneous Cloud Infrastructures, 2014 IEEE International Conference on Cloud Engineering, Jan. 1, 2014.

International Search Report dated Oct. 21, 2020, issued in International Patent Application No. PCT/KR2020/009365.

* cited by examiner

$$\text{SCALE METRIC} = \frac{(\#HM * HSF) + (\#MM * MSF) + (\#LM * LSF)}{\# \text{Consumer Instances}}$$

HM = High Messages
MSF = High Scale Factor
MM = Medium Messages
MSF = Medium Scale Factor
LM = Low Messages
LSF = Low Scale Factro

METHOD AND APPARATUS FOR SCALING RESOURCES OF GRAPHICS PROCESSING UNIT IN CLOUD COMPUTING SYSTEM

CROSS-REFERENCE TO RELATED APPLICATION(S)

This application is based on and claims priority under 35 U.S.C. § 119(a) of a Philippine patent application number 1-2019-050292, filed on Dec. 22, 2019, in the Intellectual Property Office of the Philippines, the disclosure of which is incorporated by reference herein in its entirety.

BACKGROUND

The disclosure relates to a cloud computing system. More particularly, the disclosure relates to a method and apparatus for scaling resources of a graphics processing unit (GPU) in a cloud computing system.

Cloud computing, the on-demand delivery of compute power, database storage, applications, and other resources through a cloud services platform using the internet, is now a leading computing technology. Such cloud computing utilizes central processing unit (CPU); however, graphics processing unit (GPU) can also be used depending on user requests and the kind of computation being done.

Currently, cloud computing service technologies are not capable of auto-scaling containers in the cloud computing based on GPU utilization and queued requests. In addition, the GPU is only utilized by a single service and is normally manually set. If there are different services that needs to use GPU, separate instances can be created in advance. Also, there is no priority of GPU processing for requests for services, so all requests are usually executed sequentially.

Therefore, a need exists for a scheme to efficiently scale resources of the GPU in cloud computing.

The disclosure provides a method and apparatus for efficiently scaling resources of a GPU in a cloud computing.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

Additional aspects will be set forth in part in the description which follows and, in part, will be apparent from the description, or may be learned by practice of the presented embodiments.

In accordance with an aspect of the disclosure, a method for scaling resources of a graphics processing unit (GPU) in a cloud computing system is provided. The method includes receiving requests for services from a client device; queuing the received requests in a message bus based on a preset prioritization scheme; and scaling the resources of the GPU for the requests queued in the message bus according to a preset prioritization loop.

In accordance with another aspect of the disclosure, an apparatus for scaling resources of a graphics processing unit (GPU) in a cloud computing system is provided. The apparatus includes an input/output unit configured to receive requests for services from a client device; and at least one processor configured to queue the received requests in a message bus based on a preset prioritization scheme and scale the resources of the GPU for the requests queued in the message bus according to a preset prioritization loop.

The technical problem to be solved in the disclosure is not limited to the technical problems as described above, and technical problems not described above will become apparent to those skilled in the art from the following detailed description.

The terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, and the like, and the term "controller" means any device, system or part thereof that controls at least one operation, and such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Although ordinal numbers such as "first," "second," and so forth will be used to describe various components, those components are not limited herein. The terms are used only for distinguishing one component from another component. For example, a first component may be referred to as a second component and likewise, a second component may also be referred to as a first component, without departing from the teaching of the disclosure. The term "and/or" used herein includes any and all combinations of one or more of the associated listed items.

The terminology used herein is for the purpose of describing various embodiments only and is not intended to be limiting. As used herein, the singular forms are intended to include the plural forms as well, unless the context clearly indicates otherwise. It will be further understood that the terms "comprises" and/or "has," when used in this specification, specify the presence of a stated feature, number, step, operation, component, element, or combination thereof, but do not preclude the presence or addition of one or more other features, numbers, steps, operations, components, elements, or combinations thereof.

The terms used herein, including technical and scientific terms, have the same meanings as terms that are generally understood by those skilled in the art, as long as the terms are not differently defined. It should be understood that terms defined in a generally-used dictionary have meanings coinciding with those of terms in the related technology.

Definitions of terms as used in embodiments of the disclosure are as below.

The term "cloud computing system" refers to a system for delivering virtualized (information technology) IT resources over the internet. This cloud computing system replaces local computers and private data centers with virtual infrastructure. In this cloud computing system, users access a virtual computer, a network, and storage resources made available online by a remote provider. These resources can be provisioned instantly, which is particularly useful for companies that need to scale the infrastructure of the resources up or down quickly in response to fluctuating demand.

The term "graphics processing unit" or "GPU" refers to any device which may be embedded on the motherboard, on the central processing unit (CPU) die of a node, or on a graphics board/video card. GPUs are designed to accelerate the generation of images in a buffer frame to be output on a display device.

The term "video random access memory" or "VRAM" refers to any device, used as a memory device specifically for video adapters or 3-D accelerators. VRAM normally has two independent access ports instead of one, allowing the CPU and graphics processor to access the RAM simultaneously. The amount of VRAM is a determining factor in the resolution and color depth of the display. VRAM is also used to hold graphics-specific information such as 3-D geometry data and texture maps.

The term "container" refers to executable unit of software in which application code is packaged, along with its libraries and dependencies, in common ways so that it can be run anywhere, whether it be on desktop, traditional IT, or the cloud. Container is a form of operating system (OS) virtualization in which features of the OS are leveraged to both isolate processes and control the amount of CPU, memory, and disk that those processes have access to. Containers are small, fast, and portable because unlike a virtual machine, containers do not need include a guest OS in every instance and can, instead, simply leverage the features and resources of the host OS.

The term "container-based service" refers to computation services in a cloud computing system that uses container OS virtualization instead of a virtual machine.

The term "scale out" refers the addition of new resources (horizontal growth) instead of increasing the capacity of current resources (known as vertical growth/scaling up). As used in a cloud computing system, a scale-out growth means linking together other lower-performance computation services to collectively do the work of a much more advanced one.

The term "scale in" refers to the opposite definition of scale out. In scaling in in a cloud computing system, the computation services are reduced.

Figure 1:
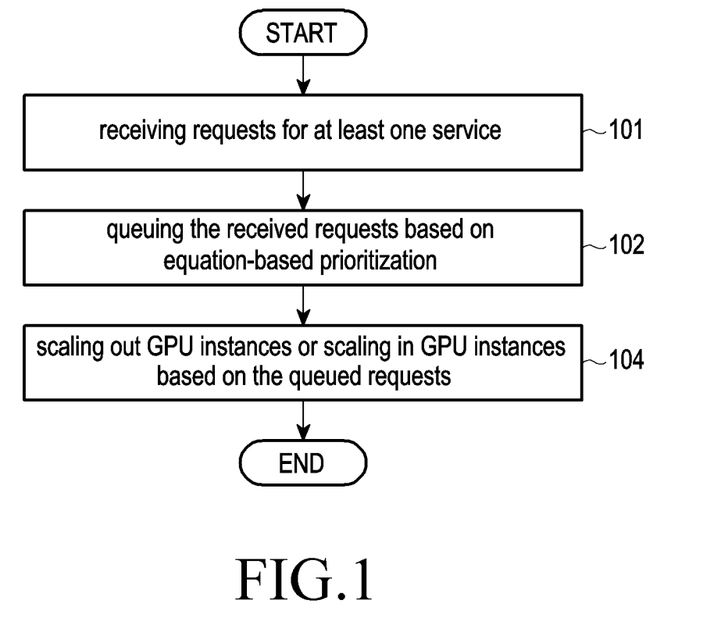
FIG. 1 illustrates a method for dynamically scaling resources of a graphics processing unit (GPU) in a cloud computing system according to an embodiment of the disclosure.

FIG. 1 illustrates a method for dynamically scaling resources of a GPU in a cloud computing system according to an embodiment of the disclosure.

Referring to FIG. 1, the cloud computing system receives requests for at least one service from a client device in operation 101. Then, the cloud computing system queues the received requests in a corresponding area of a message bus based on equation-based prioritization for the requests in operation 102. The prioritization is done for cost effective GPU resource scaling. In an embodiment of the disclosure, as a prioritization method by identifying the received requests, use of equation-based prioritization has been described, but a prioritization method that is different from equation-based prioritization may be used according to a type/service purpose of the received requests.

For example, the message bus may include storage regions (e.g., queues) respectively corresponding to a high priority request, a medium priority request, and a low priority request. Thus, the cloud computing system may store the requests in the storage regions corresponding to the high priority request, the medium priority request, and the low priority request, based on the performed prioritization. The memory bus is described as including the storage regions respectively corresponding to the high priority request, the medium priority request, and the low priority request, but the memory bus may include one or more queues according to an embodiment.

Then, based on the queued requests, the cloud computing system scales out GPU instances or scales in GPU instances in operation 104. Preferably, the GPU instances pertain to the GPU resources applied to GPU-based services. Alternatively, the GPU instances pertains to the GPU-based services itself.

In an embodiment of the disclosure, the cloud computing system is implemented in container-based services with dedicated GPU per services. In another embodiment, the cloud computing system is implemented in virtual machines.

Figure 2:
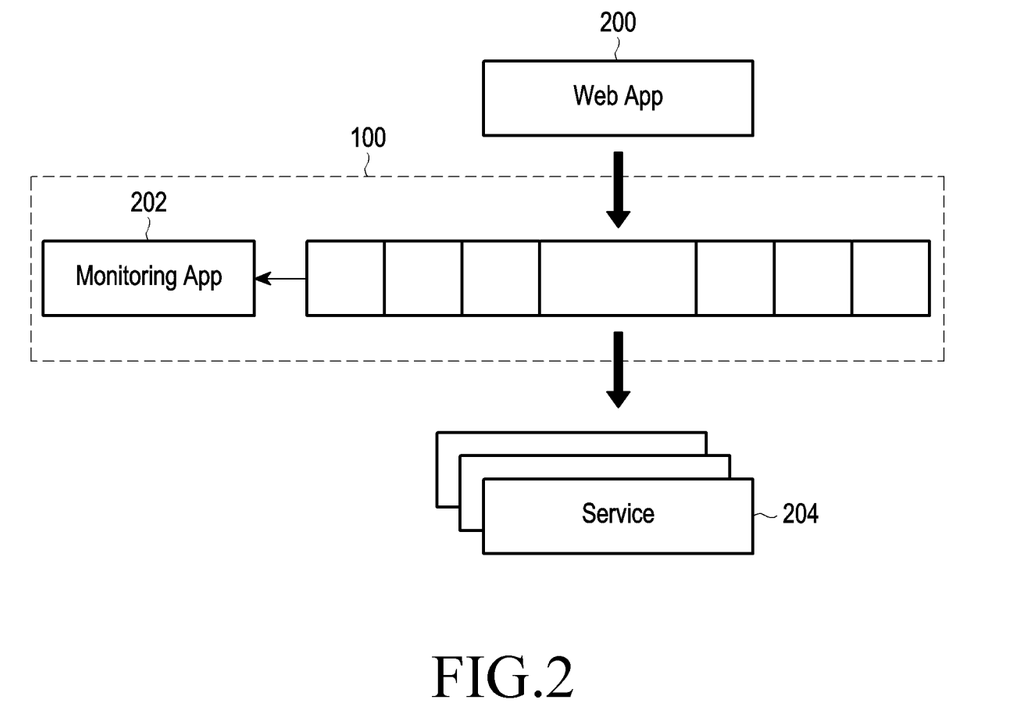
FIG. 2 shows a high-level block diagram of a cloud computing system that implements according to an embodiment of the disclosure.

FIG. 2 shows a high-level block diagram of a cloud computing system that implements according to an embodiment of the disclosure.

Referring to FIG. 2, the method according to an embodiment of the disclosure is preferably used in a cloud computing system. A cloud computing system 100 provides a user computation services via internet. Processing operations for providing user computation services via the Internet are performed by at least one processor included in the cloud computing system 100. The at least one processor included in the cloud computing system 100 will be described in detail below with reference to FIG. 6.

Referring to FIG. 2, a user outside the cloud computing system is connected to the cloud computing system 100 via a Web App 200 executed in the client device. Upon receiving requests for computation services from the user, the Web App 200 sends the requests received from the user to the cloud computing system 100. These computation services require hardware resources such as a CPU and a GPU. A monitoring app 202 included in the cloud computing system 100 checks the requests and queues the checked requests in the message bus based on the equation-based prioritization. Based on the requests, the cloud computing system 100 provides CPU or GPU resources 204 for the computation services to the user by scaling out or in GPU instances.

Figure 3:
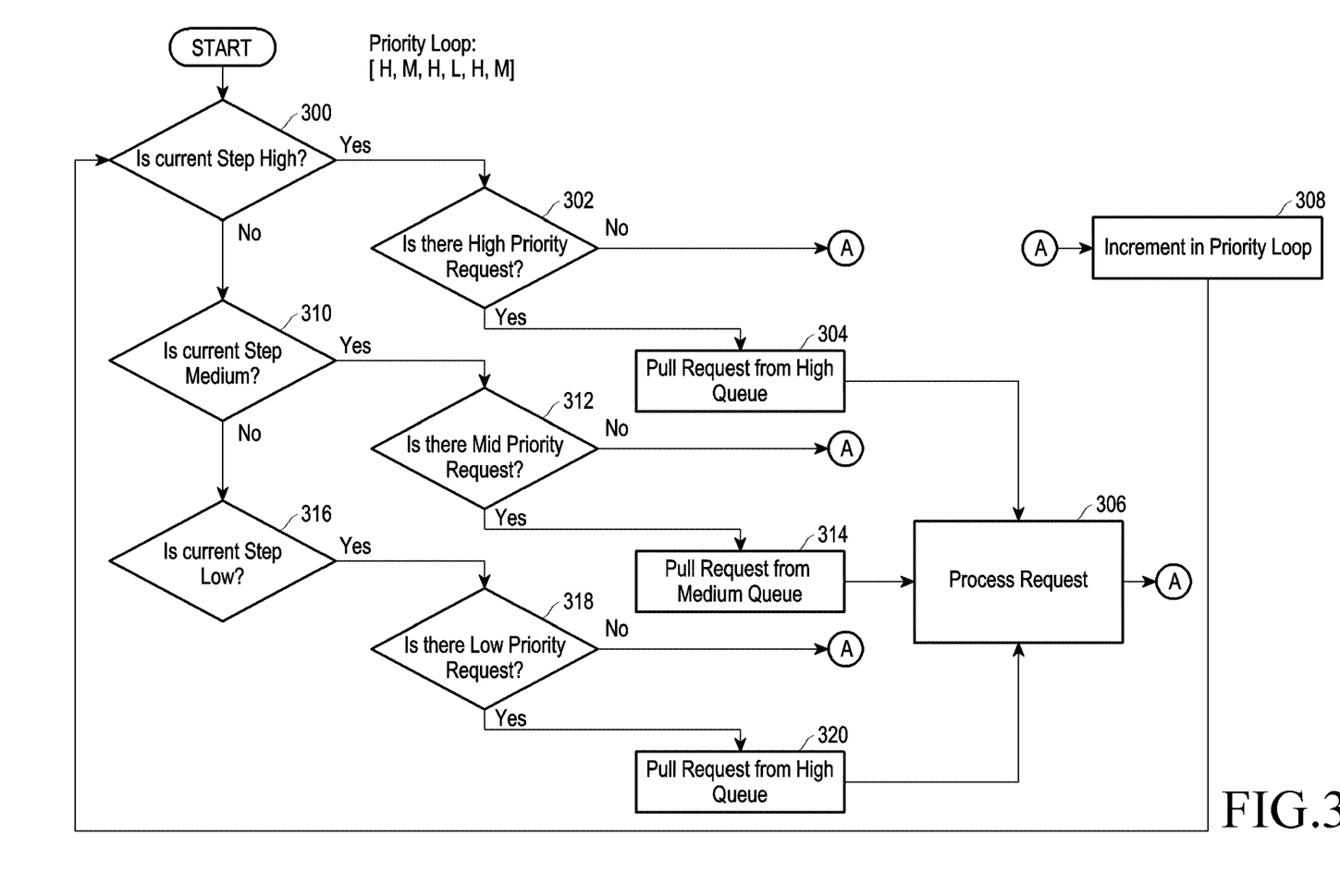
FIG. 3 illustrates a prioritization process performed in according to an embodiment of the disclosure.
Figure 4:
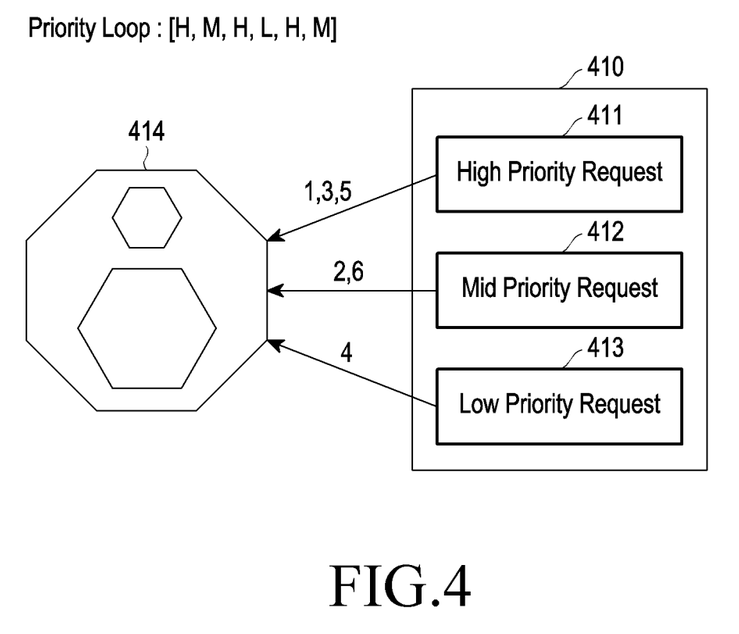
FIG. 4 illustrates an example of a prioritization process performed according to an embodiment of the disclosure.

With reference to FIGS. 3 and 4, a detailed method for scaling out or in the GPU instances based on the requests queued in the memory bus in the cloud computing system will be described.

FIG. 3 illustrates a prioritization process performed in according to an embodiment of the disclosure. The prioritization process shown in FIG. 3 is performed by the monitoring app 202 included in the cloud computing system 100 shown in FIG. 2. That is, the monitoring app 202 of the cloud computing system 100 uses the prioritization process to process requests from the users stored in the memory bus.

The priority loop used in the prioritization process shown in FIG. 3 has a notation of [H, M, H, L, H, M]. In high level, the priority loop starts processing a high priority request, then medium, high again, low, high, and then medium. Afterwards, the priority loop starts again.

Referring to FIG. 3, in low-level details, the prioritization process starts with the monitoring app 202 checking if the current step in the priority loop is high in operation 300. If the current step is high, the monitoring app 202 checks if there is a high priority request from the queue storing a high priority request in the memory bus in operation 302. If there is a high priority request, the monitoring app 202 pulls a high priority request from the queue storing the high priority request step in operation 304 and processes the high priority request in operation 306. Afterwards, the monitoring app 202 increments the priority loop to the next operation in operation 308. For example, if the current step in the priority loop is in the first position (high), the next operation is in the second position (medium).

As a result of checking by the monitoring app 202, if the high-priority request exists in the queue storing the high-priority request, if there is no high priority request in operation 302, the monitoring app 202 also increments the priority loop to the next operation in operation 308.

After incrementing the priority loop in operation 308, the monitoring app 202 checks again if the current step in the priority is high in operation 300. If the current step in the priority is not high, the monitoring app 202 checks if the current step in the priority list is medium in operation 310. If the current step is medium, the monitoring app 202 checks if there is a medium priority request from the queue storing a medium priority request in operation 312. If there is a medium priority request, the monitoring app pulls a medium priority request from the queue storing the medium priority request in operation 314 and processes the medium priority request in operation 306. Thereafter, the monitoring app 202 then increments the priority loop to the next operation in operation 308.

As a result of checking by the monitoring app 202, if the medium priority request exists in the queue storing the medium priority request, if there is no medium priority request in operation 312, the monitoring app 202 also increments the priority loop to the next operation in operation 308).

The monitoring app 202 checks if the current step in the priority loop is high in operation 300 or medium in operation 310. If the current step in the priority loop is neither high nor medium, the monitoring app 202 checks if the current step in the priority loop is low in operation 316. If the current step is low, the monitoring app 202 checks if there is a low priority request from the queue storing the low priority request in operation 318. If there is the low priority request, the monitoring app 202 pulls the low priority request from the queue storing the low priority request in operation 320 and processes the low priority request in operation 306. Thereafter, the monitoring app 202 then increments the priority loop to the next operation in operation 308.

As a result of checking by the monitoring app 202, if the low priority request exists in the queue storing the low priority request, if there is no low priority request in operation 318, the monitoring app 202 also increments the priority loop to the next operation in operation 308.

FIG. 4 illustrates an example of a prioritization process performed in according to an embodiment of the disclosure.

Referring to FIG. 4, a message bus 410 is assumed to include a first queue 411 storing a high priority request, a second queue 412 storing a medium priority request, and a third queue 413 storing a low priority request. The cloud computing system is assumed to receive six requests from a client device. In this case, the cloud computing system checks each of the requests received from the client device as one of a high priority request, a medium priority request, and a low priority request based on equation-based prioritization, and stores each of the checked requests in corresponding queues 411, 412, and 413.

Then, the cloud computing system delivers the requests respectively stored in the first queue (411, the second queue 412, and the third queue 413 in an order based on a priority loop [H, M, H, L, H, M] to a service creation unit 414. The service creation unit 414 processes the delivered request and the processing may be performed based on the scaling metric shown in FIG. 5.

Figure 5:
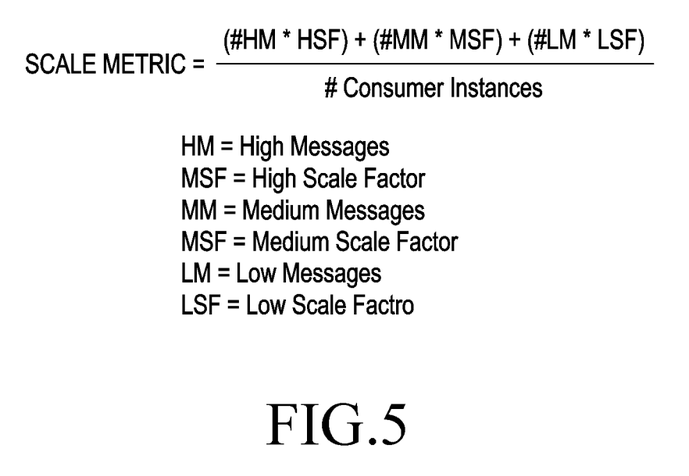
FIG. 5 is a scaling metric used in a method according to an embodiment of the disclosure.

FIG. 5 illustrates a scaling metric used in a method according to an embodiment of the disclosure.

Referring to FIG. 5, the scaling metric shown in FIG. 5 is used in identifying the scale level for the GPU instances. The scaling metric is based on the number (#HM) of high priority requests (high messages) and high priority scale factor (HSF); number (#MM) of medium priority requests (medium messages) and medium priority scale factor (MSF); number (#LM) of low priority requests (low messages) and low priority scale factor (LSF); and the number of GPU instances (consumer instances) (e.g., all requests).

Based on the result of current values of the said parameters used in the scaling metric, the cloud computing system will scale out GPU instances to the users. For example, the cloud computing system will scale out 10 GB of VRAM to users who sent high priority requests and scale out 5 GB of VRAM to users who sent medium priority requests. The high, medium, and low priority scale factors can be fixed or configurable in the cloud computing system setup.

Wherein the scaling operation (i.e., scale out or scale in) is measured based on a threshold being set for how many of a particular type can wait in the message bus. For example: the threshold is only 1 High, 3, Med and 5 Low can wait. If current count is below the said threshold, application will keep current number of instances but at any given point that threshold goes beyond/above threshold, this will automatically increase instance and will follow the sequence of [H M H L H M] sequence.

Figure 6:
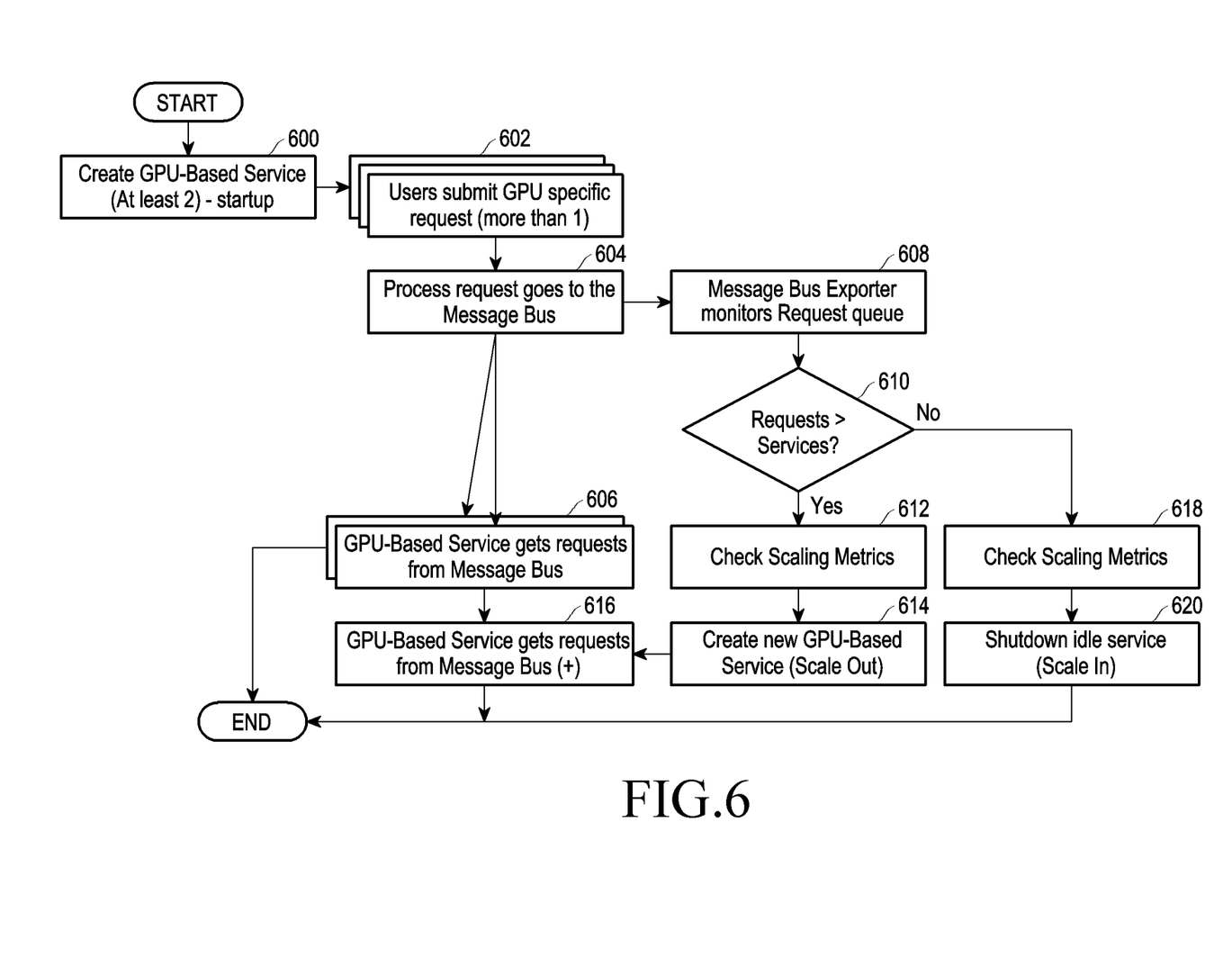
FIG. 6 illustrates a method for dynamically scaling resources of a GPU in a cloud computing system according to an embodiment of the disclosure.

FIG. 6 illustrates a method for dynamically scaling resources of a GPU in a cloud computing system according to an embodiment of the disclosure.

Referring to FIG. 6, at startup, the cloud computing system creates at least two GPU-based services in operation 600. Then, the cloud computing system receives at least two one GPU specific requests from users in operation 602. That is, one CPU specific request means one task (a process unit), one service is configured to at least two of CPU specific requests.

Afterwards, the cloud computing system delivers the received at least two GPU specific requests to a message bus and queues the received at least two GPU specific requests via equation-based prioritization in operation 604. The cloud computing system obtains the queued requests from the message bus and processes the requests in operation 606).

A message bus exporter included in the cloud computing system monitors the requests queued in the message bus in operation 608. Then, the message bus exporter checks if the number of requests queued in the message bus is greater than the number of GPU-based services in operation 610. If the number of requests queued in the message bus exceeds the number of GPU-based services, the cloud computing system checks the scaling metric (see FIG. 5) in operation 612 and scales out or creates a new GPU-based service in operation 614 according to the scaling metric. Then, the cloud computing system processes the newly created GPU-based service gets the queued requests from the message bus and processes the requests in operation 616.

When the number of requests queued is less than the number of GPU-based services, the cloud computing system checks the cooling metric in operation 618. The cooling metric is preferably a formula used in determining which GPU instance to scale in or decrease for cost effectiveness. The parameter for cost effectiveness in the cooling metric may be GPU capacity, GPU speed, operation cost, cost of cooling the GPU, etc. Based on the cooling metric, the cloud computing system scales in or decreases GPU-based services in operation 620.

When the number of requests queued in the message bus is equal to the number of GPU-based services, the cloud computing system may not perform scaling with respect to GPU-based services.

Accordingly, the cloud computing system according to the embodiment of the disclosure.

If the number of services to process within a specific time is greater than the number of tasks to process, it is determined that there are more objects to be processed and scaling out, if the number of services to process within a specific time is smaller than the number of tasks to process, it is determined that there are fewer objects to be processed and scaling in.

Figure 7:
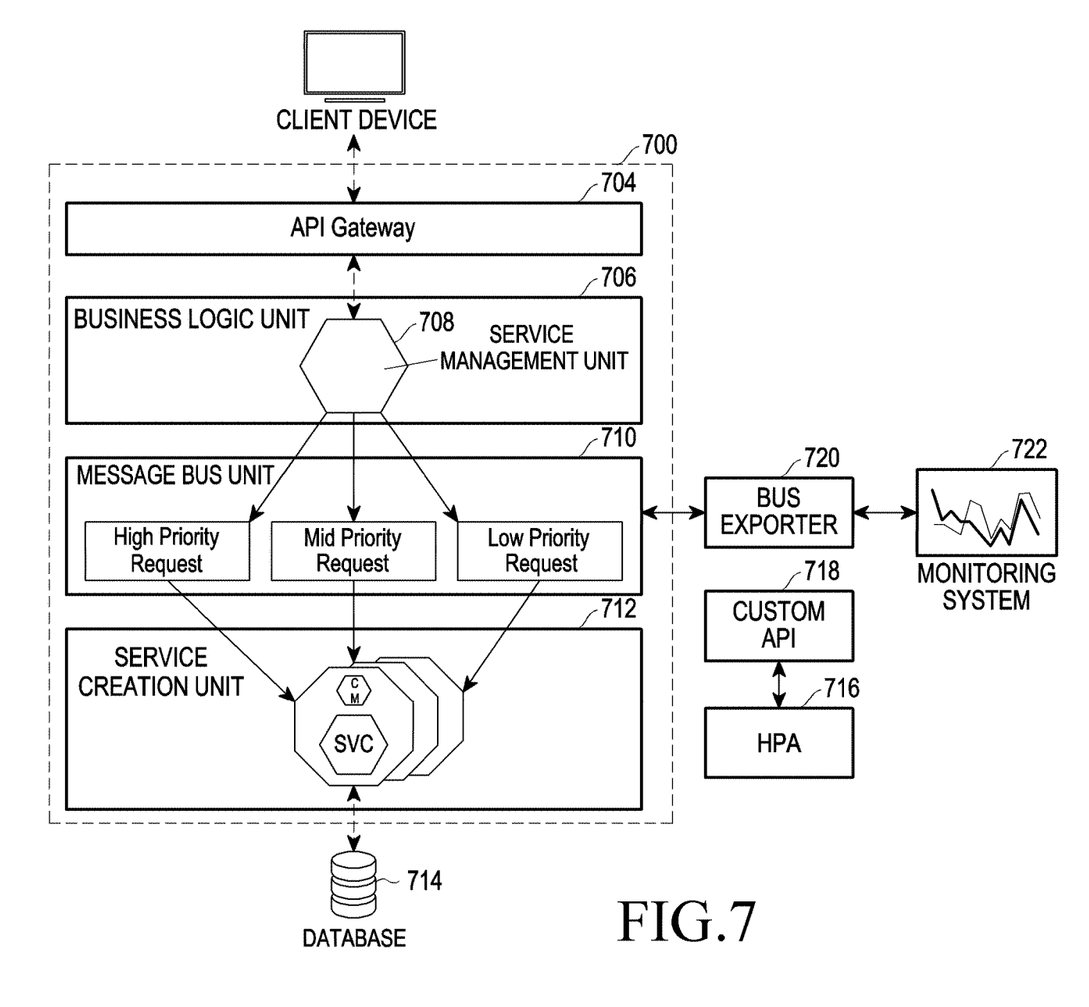
FIG. 7 shows a low-level block diagram of a cloud computing system that implements according to an embodiment of the disclosure.

FIG. 7 shows a low-level block diagram of a cloud computing system that implements methods according to an embodiment of the disclosure.

Referring to FIG. 7, a cloud computing system 700 includes at least one processor. That is, the cloud computing system 700 includes an application program interface (API) gateway 704, a business logic unit 706, a message bus unit 710, a service creation unit 712, a database 714, a custom API 718, and a message bus exporter 720. In FIG. 7, the cloud computing system 700 is illustrated as being implemented with separate units such as the API gateway 704, the business logic unit 706, the message bus unit 710, the service creation unit 712, the database 714, the custom API 718, and the message bus exporter 720, but the cloud computing system 700 may be implemented with a form or one processor in which at least two of the API gateway 704, the business logic unit 706, the message bus unit 710, the service creation unit 712, the database 714, the custom API 718, and the message bus exporter 720 are integrated.

Referring to FIG. 7, the client device 702 is connected to the cloud computing system 700 via a client device 702. Preferably, the client device 702 runs a web browser to connect to the cloud computing system 700's API Gateway 704 and sends requests for GPU-based services to the cloud computing system 700. Herein, the API gateway includes an input/output unit (i.e., inputter/outputter) that transmits and receives data to and from the client device. The API gateway 704 is then connected to a business logic unit 706 which contains a service management unit 708. Preferably, the service management unit 708 queues the requests using via equation-based prioritization and sends the queued request to a message bus unit 710. The service creation unit 712 creates one or more GPU-based services.

Furthermore, the one or more GPU-based services created in the service creation unit 712 are stored in database 714.

Also, the one or more GPU-based services created in the service creation unit 712 is delivered to a Horizontal Pod Autoscaler (HPA) 716 which is further connected to a custom API 718.

The message bus unit 710 is further connected to message bus exporter 720 that is connected to a monitoring system 722. The monitoring system 722 is an event monitoring tool that collects and visualizes metrics (e.g., graphs, charts, etc.). Such event monitoring tools are included but not limited to Prometheus.

The different components of the cloud computing system 700 shown in FIG. 7 may be connected using protocols or services, including but not limited to electrical, optical, or wireless connections at the physical layer; Ethernet, Fibre channel, (asynchronous transfer mode) ATM, and a synchronous optical network (SONET) at a medium access memory (MAC) layer; a transmission control protocol (TCP), a (user datagram protocol (UDP), ZeroMQ or other services at the connection layer; and (extensible messaging and presence protocol (XMPP), a hypertext transfer protocol (HTTP), an advanced message queuing protocol (AMPQ), a simple text oriented messaging protocol (STOMP), a short message service (SMS), a simple main transfer protocol (SMTP), a simple network management protocol (SNMP), or other standards at the protocol layer.

In yet another embodiment, the scaling method according to the embodiments of the present disclosure is agnostic which can be deployed in either on-premise, private cloud, or any public cloud.

In one embodiment of the client device 702 is connected to the cloud computing system 700 one or more cloud models. Depending on the type of cloud service provided, these cloud models give varying amounts of control relative to the provisioning of resources within the cloud computing system 700. For example, Software as a Service (SaaS) cloud model will typically only give information and access relative to the application running on the cloud computing system 700, and the scaling and processing aspects of the cloud computing system 700 will be obscured from the user. Platform as a Service (PaaS) cloud model will typically give an abstract Application Programming Interface (API) that allows developers to declaratively request or command the backend storage, computation, and scaling resources provided by the cloud computing system 700, without giving exact control to the user. Infrastructure as a Service (IaaS) cloud model will typically provide the ability to directly request the provisioning of resources, such as computation units, software defined or software-controlled network elements like routers, switches, domain name servers, etc., file or object storage facilities, authorization services, database services, queue services and endpoints, etc. In addition, users interacting with an IaaS cloud are typically able to provide virtual machine images that have been customized for user-specific functions.

Providing a scaling method in a cloud platform according to the embodiments of the present disclosure may offer cost efficient solution in GPU utilization. With the capability of prioritization scaling, the method according to the embodiments of the present disclosure enables the cloud computing system 700 to process requests more effective and have a full utilization of GPU resources. For example, the cloud computing system 700 process smaller requests to finish more tasks compared to sequential processing.

With a dynamic GPU-based services, the cloud computing system 700 according to the embodiments of the present disclosure will be able to support multiple types of requests with no extra cost as there is no dedicated GPU instances should be set up in advance.

It is contemplated for embodiments described in the present disclosure to extend to individual elements and concepts described herein, independently of other concepts, ideas or system, as well as for embodiments to include combinations of elements recited anywhere in this application. It is to be understood that the present disclosure is not limited to the embodiments described in detail with reference to the accompanying drawings. As such, many variations and modifications will be apparent to practitioners skilled in this art. Illustrative embodiments such as those depicted refer to a preferred form but is not limited to its constraints and is subject to modification and alternative forms. Accordingly, it is intended that the scope of the present disclosure be defined by the following claims and their equivalents. Moreover, it is contemplated that a feature described either individually or as part of an embodiment may be combined with other individually described features, or parts of other embodiments, even if the other features and embodiments make no mention of the said feature. Hence, the absence of describing combinations should not preclude the inventor from claiming rights to such combinations.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for scaling resources of a graphics processing unit (GPU) in a cloud computing system, the method comprising:
   receiving requests for services from a client device;
   queuing each of the received requests in one of a plurality of queues in a message bus according to a priority level of each of the received requests, wherein the plurality of queues in the message bus comprises a first queue for a high priority request, a second queue for a medium priority request, and a third queue for a low priority request; and
   scaling the resources of the GPU for the requests each queued in one of the plurality of queues in the message bus according to a preset prioritization loop and a scale level identified using a scaling metric which is based on a number of high priority requests and a high priority scale factor, a number of medium priority requests and a medium priority scale factor, a number of low priority requests and a low priority scale factor and a number of the requests queued in the message bus.

2. The method of claim 1, wherein the cloud computing system is implemented with container-based services using a dedicated GPU per service.

3. The method of claim 1, wherein the preset prioritization loop is repeated in an order of:
   a high priority request,
   a medium priority request,
   a high priority request,
   a low priority request,
   a high priority request, and
   a medium priority request.

4. The method of claim 1, wherein the queuing of the received requests comprises:
   identifying each of the received requests as one of a high priority request, a medium priority request, or a low priority request; and
   queuing each request in the message bus.

5. The method of claim 1, wherein the scaling of the resources comprises:
   checking a request for performing a scaling operation among the requests queued in the message bus according to the preset prioritization loop; and
   scaling out or in a resource for the checked request based on the scaling metric.

6. The method of claim 5, wherein the scaling metric is $$\text{SCALE METRIC} = \frac{(\# \ HM * HSF) + (\# \ MM * MSF) + (\# \ LM * LSF)}{\# \ \text{Consumer instances}},$$

where #HM represents the number of high priority requests, #MM represents the number of medium priority requests, #LM represents the number of low priority requests, HSF represents the high priority scale factor, MSF represents the medium priority scale factor, LSF represents the low priority scale factor, and #Consumer Instances represents the number of the requests queued in the message bus.

7. The method of claim 6, wherein the scaling out or in comprises:
   scaling out the resources of the GPU for the requests queued in the message bus based on the scaling metric, when the number of the requests queued in the message bus exceeds a number of the services; and scaling in the resources of the GPU for the requests queued in the message bus based on a cooling metric, when the number of the requests queued in the message bus is less than the number of the services.

8. The method of claim 7, wherein a parameter of the cooling metric comprises at least one of:
a capacity of the GPU,
a speed of the GPU,
a system operating cost, or
a cost for cooling the GPU.

9. An apparatus for scaling resources of a graphics processing unit (GPU) in a cloud computing system, the apparatus comprising:
an input/output device configured to receive requests for services from a client device; and
at least one processor configured to:
queue each of the received requests in one of a plurality of queues in a message bus according to a priority level of each of the received requests, wherein the plurality of queues in the message bus comprises a first queue for a high priority request, a second queue for a medium priority request, and a third queue for a low priority request, and
scale the resources of the GPU for the requests each queued in one of the plurality of queues in the message bus according to a preset prioritization loop and a scale level identified using a scaling metric which is based on a number of high priority requests and a high priority scale factor, a number of medium priority requests and a medium priority scale factor, a number of low priority requests and a low priority scale factor and a number of the requests queued in the message bus.

10. The apparatus of claim 9, wherein the cloud computing system is implemented with container-based services using a dedicated GPU per service.

11. The apparatus of claim 9, wherein the preset prioritization loop is repeated in an order of:
a high priority request,
a medium priority request,
a high priority request,
a low priority request,
a high priority request, and
a medium priority request.

12. The apparatus of claim 9, wherein the at least one processor is further configured to identify each of the received requests as one of:
a high priority request,
a medium priority request, or
a low priority request and queue each request in the message bus.

13. The apparatus of claim 9, wherein the at least one processor is further configured to:
check a request for performing a scaling operation among the requests queued in the message bus according to the preset prioritization loop, and
scale out or in a resource for the checked request based on the scaling metric.

14. The apparatus of claim 13, wherein the scaling metric is $$\text{SCALE METRIC} = \frac{(\#\ HM * HSF) + (\#\ MM * MSF) + (\#\ LM * LSF)}{\#\ \text{Consumer instances}},$$

where #HM represents the number of high priority requests, #MM represents the number of medium priority requests, #LM represents a number of low priority requests, HSF represents the high priority scale factor, MSF represents the medium priority scale factor, LSF represents the low priority scale factor, and #Consumer Instances represents the number of requests queued in the message bus.

15. The apparatus of claim 14, wherein the at least one processor is further configured to:
scale out the resources of the GPU for the requests queued in the message bus based on the scaling metric, when the number of the requests queued in the message bus exceeds a number of the services, and
scale in the resources of the GPU for the requests queued in the message bus based on a cooling metric, when the number of the requests queued in the message bus is less than the number of the services.

16. The apparatus of claim 15, wherein a parameter of the cooling metric comprises at least one of:
a capacity of the GPU,
a speed of the GPU,
a system operating cost, or
a cost for cooling the GPU.

17. The apparatus of claim 15, wherein, based on the cooling metric, the cloud computing system one of scales in or decreases GPU-based services.

18. The apparatus of claim 13, wherein the scaling operation is measured based on a threshold being set based on a number of requests of a particular type which are allowed to wait in the message bus.

* * * * *